United States Patent
Orenstein et al.

(10) Patent No.: US 9,921,344 B2
(45) Date of Patent: Mar. 20, 2018

(54) PLASMONIC LENS HAVING A SURFACE PATTERN PROVIDING LINEAR-POLARIZATION-INDEPENDENT PLASMONIC FOCUSING AND CIRCULAR POLARIZATION DEPENDENT PLASMONIC FOCUSING

(71) Applicant: Technion Research & Development Foundation Limited, Haifa (IL)

(72) Inventors: Meir Orenstein, Haifa (IL); Grisha Spektor, Haifa (IL)

(73) Assignee: TECHNION RESEARCH & DEVELOPMENT FOUNDATION LIMITED (IL)

( * ) Notice: Subject to any disclaimer, the term of this patent is extended or adjusted under 35 U.S.C. 154(b) by 4 days.

(21) Appl. No.: 14/988,726

(22) Filed: Jan. 5, 2016

(65) Prior Publication Data
US 2016/0313477 A1    Oct. 27, 2016

Related U.S. Application Data

(60) Provisional application No. 62/099,685, filed on Jan. 5, 2015.

(51) Int. Cl.
G02B 5/00 (2006.01)
G01J 1/04 (2006.01)

(52) U.S. Cl.
CPC ............ G02B 5/008 (2013.01); G01J 1/0411 (2013.01)

(58) Field of Classification Search
CPC .... G02B 5/008; G02B 6/1226; G02B 3/0012; G02B 2203/06; G01J 1/0411
USPC ................................................ 250/225, 214.1
See application file for complete search history.

(56) References Cited

U.S. PATENT DOCUMENTS 8,680,455 B2 * 3/2014 Salsman ................ G02B 5/008
250/208.1

OTHER PUBLICATIONS

Lin, Jiao et al, The Polarization-Controlled Tunable Directional Coupling of Surface Plasmon Polaritons, Science vol. 340, Apr. 19, 2013, pp. 331-334.

* cited by examiner

*Primary Examiner* — Que T Le
(74) *Attorney, Agent, or Firm* — Fish IP Law, LLC

(57) ABSTRACT

A plasmonic lens is presented comprising a surface for interaction with an input electromagnetic field, wherein this surface has a pattern comprising an arrangement of a plurality of elongated spaced-apart features of a predetermined geometry arranged in a spaced-apart relationship along at least one segment of a spiral curve, each of the pattern features defining an elongated interface for creation of surface waves in response to the interaction with the incident electromagnetic field, such that the pattern provides linear-polarization-independent plasmonic focusing and large area, high contrast, circular polarization dichroic plasmonic focusing.

14 Claims, 5 Drawing Sheets

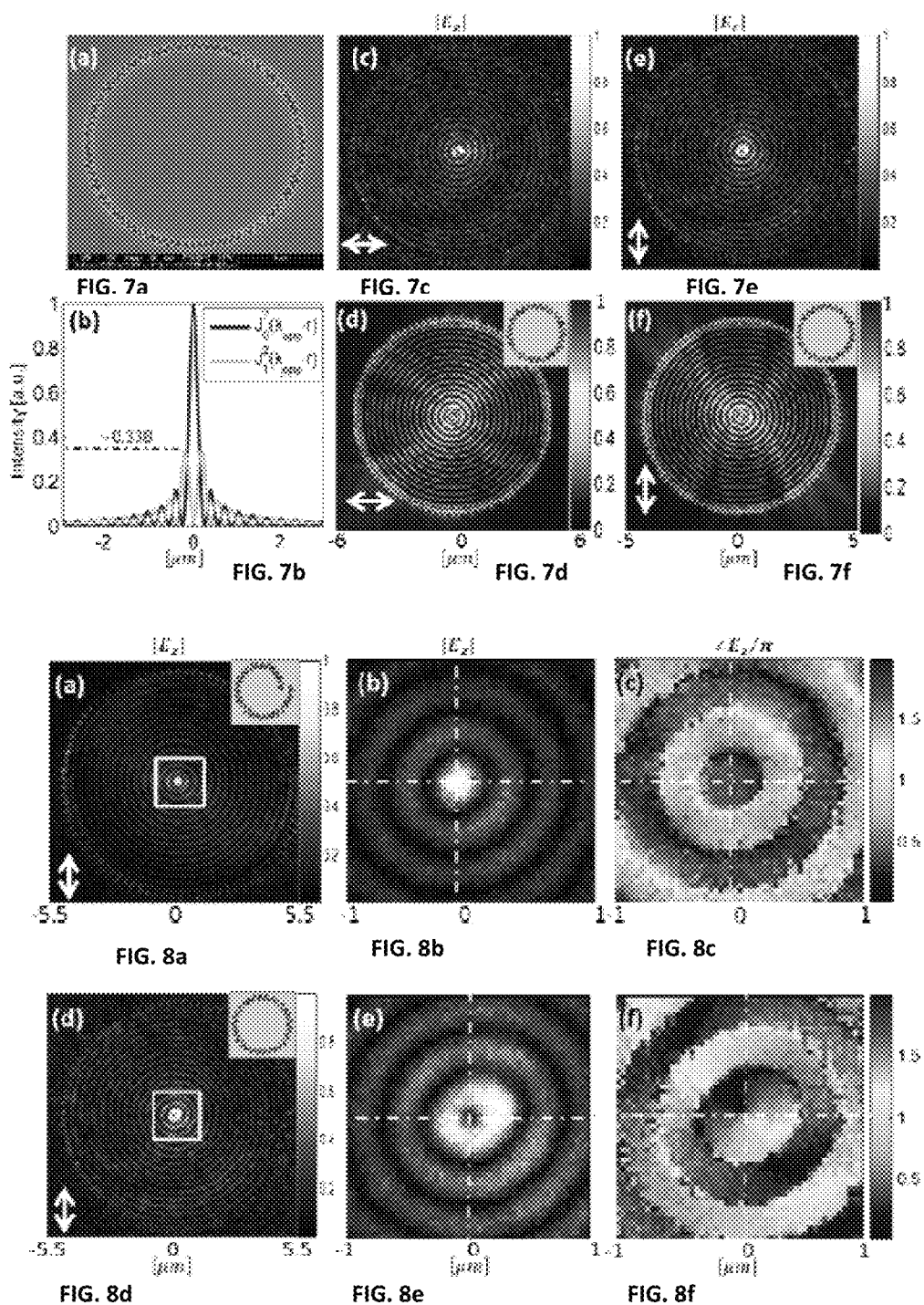

PLASMONIC LENS HAVING A SURFACE PATTERN PROVIDING LINEAR-POLARIZATION-INDEPENDENT PLASMONIC FOCUSING AND CIRCULAR POLARIZATION DEPENDENT PLASMONIC FOCUSING

This Application claims priority to U.S. Provisional Patent Application Ser. No. 62/099,685 filed Jan. 5, 2015.

TECHNOLOGICAL FIELD AND BACKGROUND

The present invention relates to plasmonic lenses and their use in imaging systems.

A plasmonic lens is a lens that directs surface plasmon polaritons (SPPs) to converge towards a single focal point. SPPs are surface waves that arise at metal-dielectric interfaces when an electromagnetic field oscillates in unison with free electrons at the surface of the metallic interface constituent.

SPPs can be generated, for instance, by interaction of laser light at a given wavelength (excitation illumination) with corrugations created on metallic surfaces. These waves are confined to the interface and have a wavelength that is much smaller than the wavelength of the excitation illumination at the same frequency. The SPP has electric field components that lie both in and out of the interface plane. The out-of-plane component inside the dielectric constituent has a much higher electromagnetic energy contents and therefore obtaining a concentrated spot of this component is desirable in various devices.

A simple example of a plasmonic lens is a series of concentric rings on a metal film. Any light that hits the film from free space at normal incidence will be coupled into SPPs (this part works like a grating coupler), and the SPPs will be heading towards the center of the circles as well as outwards, away from the center of the circles. However, the out-of-plane component in a concentric configuration will destructively interfere in the center, forming a dark focal spot.

SUMMARY OF THE INVENTION

As indicated above, a plasmonic lens directs SPPs to converge into a single focal point. Since SPPs can be of very small wavelengths, they can converge into a very small and very intense spot, much smaller than that allowed by the free-space diffraction limit. The out-of plane SPP field components have much higher electromagnetic energy contents than the in-plane components and are desirable in various devices, such as those satisfying the absorption selection rules of unipolar quantum wells based detectors, and can therefore be used in various sensing applications.

Plasmonic lenses are of substantial importance in the field of nano-plasmonics—manifesting the core significance of nano-plasmonics—the confinement of waves to a surface and focusing them to a tiny focal spot. Of key importance to any application of plasmonic focusing is the power directed toward the focal spot of a plasmonic lens, which ultimately determines the signal-to-noise ratio and the resolution. However, the known designs share common efficiency problems.

The present invention is aimed at providing a novel plasmonic lens configuration capable of providing efficient functional in-plane focusing and thus enabling such a lens to be used in a sensitive multi-polarization pixel. The meaning of the efficient in-plane focusing is schematically illustrated in FIG. 1.

More specifically, the following should be noted. A plasmonic lens is usually formed by predefined shaped boundaries engraved in the metal layer. When excited by a light beam impinging vertically on this interface, the boundaries serve as secondary sources for propagating SPPs that are combined to generate an in-plane focal point. Focusing of the out-of-plane field component means generating constructive interference of this field component at the focal point on the metal-dielectric interface.

Another goal of plasmonic lensing is achieving "functional focusing", namely conditioning the existence of a focal spot on some parameter(s) of the illumination. One such desirable parameter is the polarization of the illuminating beam. A polarization dichroic plasmonic lens focuses SPPs generated with a certain illumination polarization and does not focus the orthogonal polarization state. Today's plasmonic polarization dichroic lenses achieve high contrast dichroism in small areas on the order of the SPP wavelength. This poses severe limitation on the application of such lenses with existing detectors.

Reference is made to FIGS. 2a-g showing limitation of the existing techniques with regard to focal spot efficiency. FIGS. 2a,b,c present simulations and FIGS. 2e,f,g present the results of experiments conducted by the inventors demonstrating performance of the configurations of FIGS. 2a,e corresponding to spiral lens and FIGS. 2b,c,f,g corresponding to half circles lens. The insets on the top left corners of FIGS. 2a,b,c present the lens structure, and the arrows shown in the figures indicate the respective polarization direction of the illumination.

FIGS. 2a,e correspond to the Archimedes Spiral structure of the plasmonic lens PL which seems to be the favorable choice for a plasmonic lens to focus linearly polarized illumination. This is because the distances from opposite points on the boundary to the center differ by half wavelength, which is the necessary condition for focusing the out-of-plane plasmonic field component. The Archimedes Spiral Plasmonic Lens (ASPL) thus focuses incident light with arbitrary linear polarization, and in addition serves as a selective lens for the proper handedness of a circular polarization (circular dichroic lens).

However, the focal spot obtainable by the spiral plasmonic lens is not ideal because the spiral geometry is not equidistant from its center (on top of the half wavelength discussed above). This angular distance dependence results in a weaker, temporally incoherent, focal spot.

With regard to polarization dependence, the following should be noted. Mitigating the above spot-related problem by deforming geometrically the spiral to get equidistant boundaries (except from half a wavelength difference of opposing points as explained above) results in a plasmonic lens PL of a half-circles configuration (FIGS. 2b,c,f,g), but only for one specific linear polarization direction (FIGS. 2b,f). While the orthogonal direction results in destructive interference and a dark focal spot (FIGS. 2c,g).

Additional basic problem of known plasmonic lenses is associated with the SPP coupling efficiency. More specifically, SPPs are generated only for fields which are perpendicular to the engraved boundaries. Hence, only ~0.5 of the illuminating light interacts with the structure (also for circular polarization at any given time), as evident from the plasmonic field pattern of FIGS. 2a,e and FIGS. 2b,f.

Yet another efficiency related problem is associated with the equal amount of SPPs' power propagating inwards and outwards from the boundaries. This reduces the efficiency by additional factor of 2.

When using the plasmonic lens in a pixel of imaging detector, in addition to the above-described features of the lens, such feature as contrast is of great importance. In this connection, the following should be noted. Although the spiral design of the lens is theoretically discriminating between left and right circular polarizations (focal point vs. vortex at the center), as well as the half-circles lens discriminates between horizontal and vertical illuminations (FIGS. 2b,c,f,g)), actual realization with finite size focal point detector (pixel) using such type of plasmonic lenses will have severe contrast limitation. This is evident from the spatial proximity of the major lobe of FIG. 2b to those of FIG. 2c.

Thus, there is a need in the art in a novel configuration of a plasmonic lens providing desirably high signal-to-noise of the focusing effect and desirable efficiency. The latter is actually defined by two factors, one being associated with maximizing the amount of light coupled into the excited SPPs and the ability to concentrate all this power into a single, constructive focal spot.

As described above, the spiral-shaped plasmonic lenses suffer from insufficient focusing effect, i.e. blur of the focal spot. This is because of the difference in distances from different pairs of opposite points on the boundary of the lens to the center, and thus in a difference in time of arrival to the focus for light-excited SPPs from such opposite points. While such spot-size problem can be solved by the half-circles configuration of the lens, such configuration suffers from the fact it provides for desired focusing only for one of the two linear polarizations of input illumination and is not circularly dichroic.

Plasmonic couplers, that enable polarization-controlled tunable directional coupling with polarization-invariant total conversion efficiency and preserve the incident polarization information, have been developed ("The Polarization-Controlled Tunable Directional Coupling of Surface Plasmon Polaritons", Jiao Lin et al., SCIENCE VOL 340 19 Apr. 2013, pp. 331-334. According to this technique, directional coupling is suggested to be achieved by using properly arranged elongated apertures. Moreover, a circularly shaped arrangement of the aperture was suggested to couple SPPs inward or outward. However in order to obtain plasmonic focusing, the prerequisite phase conditions on the generated SPPs should be met, as described further in the Detailed Description section.

The plasmonic lens of the invention addresses all the problems of the known plasmonic lenses as described above. The novel plasmonic lens of the invention provides for efficient linear-polarization-independent plasmonic focusing, and allows for using all the perimeter of the lens to couple light into SPPs. When illuminated with circularly polarized light, the lens focuses SPPs one polarization and does not focus that of the orthogonal state. For the focused state, the SPPs propagate substantially only inward and practically no energy goes outward resulting in an additional gain of a factor of 2 over the existing methods. Whereas for the not focused polarization, the SPPs are expelled from the whole interior of the lens, propagating only outwards.

The plasmonic lens of the invention provides for achieving high contrast circular dichroism inside a large area. This allows seamless integration of the plasmonic lens with actual detectors. The out-of-plane field components are desirable in various devices, for example satisfying the absorption selection rules of unipolar quantum wells based detectors. The plasmonic lens of the invention in combination with these detectors may serve as a circular polarization discriminating pixel. It should, however, be understood that the plasmonic lens of the invention may advantageously be used with any type detector.

Thus, the invention in its one aspect provides a plasmonic lens configured with a patterned surface. The pattern comprises a plurality of elongated spaced-apart features arranged along a segment of a spiral curve. Each of these features defines an elongated interface for creation of surface waves in response to an incident electromagnetic field. The plasmonic lens having said patterned surface provides linear-polarization-independent plasmonic focusing and circular polarization dependent plasmonic focusing.

In some embodiments, the patterned surface is a metallic surface formed with the plurality of elongated slits (constituting the spaced-apart features of the pattern), such that the slit/feature defines the elongated metallic-dielectric interface. The spiral curve may be configured as the Archimedes spiral curve. The features/slits may be arranged in two arrays extending along and at both sides of the spiral path and being oppositely inclined with respect to the spiral path.

In another aspect, the invention provides an optical detector comprising an array of pixels, wherein each pixel includes a light sensitive surface and a respective plasmonic lens, which is located in front or behind the light sensitive surface and is configured as described above. Namely, the plasmonic lens comprises a patterned surface, the pattern comprising a plurality of elongated spaced-apart features, each defining an elongated metallic-dielectric interface, said features being arranged along a segment of a spiral curve. As indicated above, the plasmonic lens provides linear-polarization-independent plasmonic focusing and circular polarization dependent plasmonic focusing onto the respective light sensitive surface.

It should be understood that due to the improved focusing effect, i.e. reduced focal spot size, the plasmonic lens of the invention provides for reduced detector size, thus potentially improving noise figures related to the volume of the detector.

BRIEF DESCRIPTION OF THE DRAWINGS

FIG. 3a shows a SEM image of a single armed lens, and FIG. 3b shows a SEM image of 5 armed lens.

FIGS. 5a and 5c show simulation results, and FIGS. 5b and 5d show experimental results, for first (Figs. and 5b) and second (FIGS. 5c and 5d) linear polarizations.

FIGS. 6a and 6c show simulation result of left (FIG. 6a) and right (FIG. 6c)

circularly polarized illumination indicated by arrows, and FIGS. 6b and 6d show experimental results of the same.

FIGS. 7a-7f present experimental (FIGS. 7a, 7c, and 7e) and simulated results (FIGS. 7b, 7d, and 7f) for a plasmonic lens with a patterned surface.

FIGS. 8a-8f present measurements of a plasmonic lens having a meta spiral lens pattern (FIGS. 8a-8c) and measurements of a plasmonic lens having a circular lens pattern (FIGS. 8d-8f).

DETAILED DESCRIPTION OF EMBODIMENTS

Figure 1:
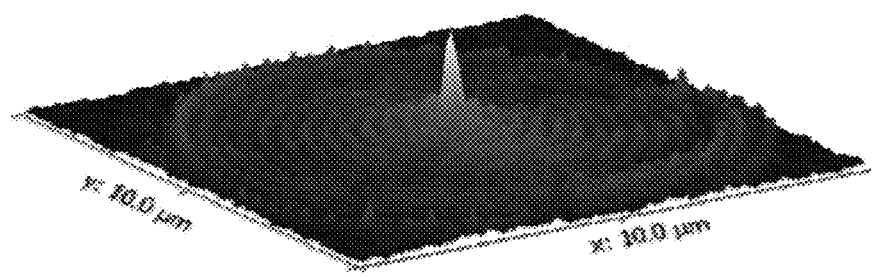
FIG. 1 demonstrates the efficient in-plane focusing effect to be achieved by a lens.
Figures 2A, 2B, 2C:
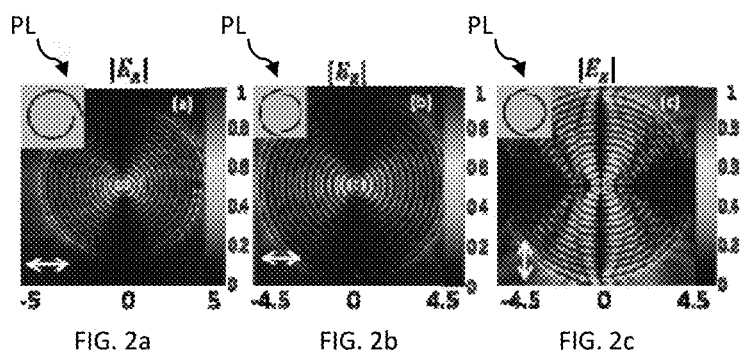
FIGS. 2a-c and 2e-g illustrate the operation of plasmonic lenses of two known configurations, i.e. the Archimedes Spiral configuration (FIGS. 2a and 2e) and half circles configuration (FIGS. 2b-c and f-g).
Figures 2E, 2F, 2G:
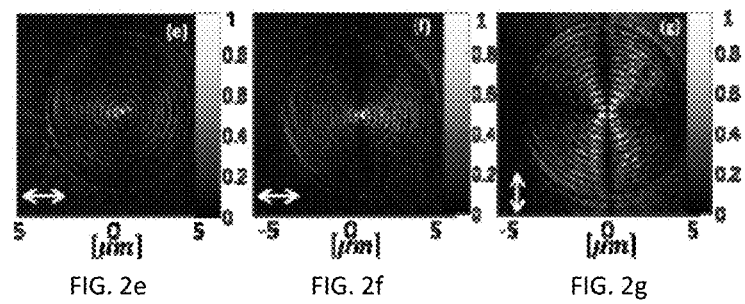

In order to better understand the subject matter that is disclosed herein and to exemplify how it may be carried out in practice, embodiments will now be described, by way of non-limiting examples only, with reference to the accompanying drawings, in which:

FIGS. 2a,b,c,e,f,g illustrate the operation of plasmonic lenses of spiral configuration (FIGS. 2a,e) and half circles configuration (FIGS. 2b,c,f,g). As described above, the spiral-shaped plasmonic lenses are incapable of providing sufficient focusing effect (they suffer from blur of the focal spot), while the lens of the half-circles configuration, although solving such spot-size problem, is capable of providing desired focusing only for one of the two linear polarizations of input illumination.

Figures 3A, 3B:
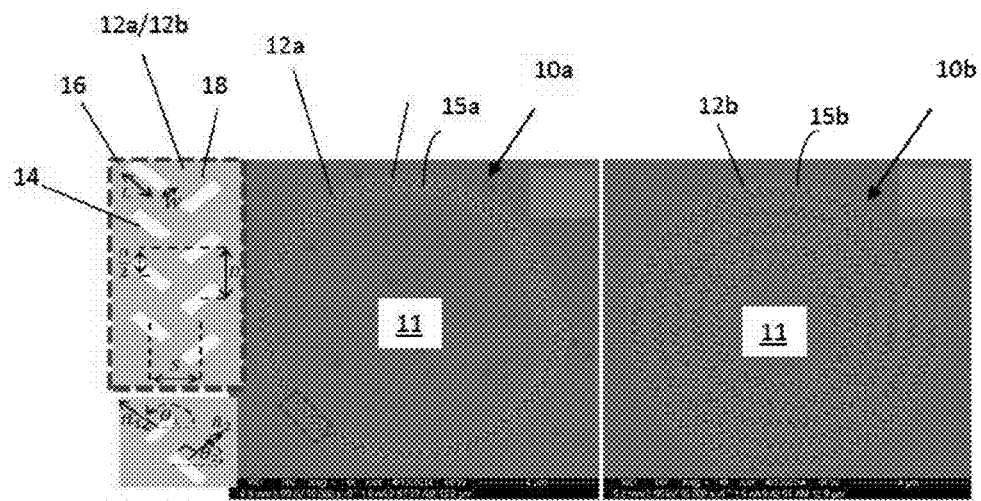
FIGS. 3a-b show two examples of a plasmonic lens of the invention, where

Reference is made to FIGS. 3a,b showing two examples of a plasmonic lens of the invention. Here, FIG. 3a is a SEM image of a single armed lens 10a, and FIG. 3b is a SEM image of 5 armed lens 10b. More specifically, as shown in the figures, each of the plasmonic lenses 10a and 10b of the invention comprises a patterned surface 11. Each of patterns 12a and 12b on the surfaces 10a and 10b, respectively, is in the form of a plurality of elongated spaced-apart features 14 each defining an elongated metallic-dielectric interface. The features 14 are arranged along a segment of a spiral curve, being a single-arm/segment curve 15a in FIG. 3a, and a 5-arm/segment curve 15b in FIG. 3b.

In the present examples, the features 14 are arranged in two arrays 16 and 18 extending along and at both sides of the spiral path 15a (or 15b), being oppositely inclined with respect to the spiral path. Also, in each of these examples, the pattern is formed by using a metallic (e.g. gold) plate 12a (or 12b) formed with slits/apertures. The apertures 14 may be fabricated by focused ion beam (FIB) patterning of the gold plate.

As will be described further below, the plasmonic lens of the invention provides linear-polarization-independent plasmonic focusing and circular polarization dependent plasmonic focusing.

Let us consider the operation of the above-described lens 10a or 10b. For operation around the central wavelength $\lambda$, the following structural parameters (geometry of the pattern, e.g. the dimensions of features and their relative accommodation, as well as relative to the spiral path) are to be selected.

$S=\lambda_{spp}/4$, where S is the distance between the adjacent/aligned features 14 in the arrays 16 and 18, and $\lambda$ is the SPP wavelength in the operational frequency;

W<<L, where W and L are respectively the width and length of the slit (i.e. high aspect ratio elongated feature). Generally, such elongated, high aspect ratio, features 14 may be of any suitable geometry, such as polygonal (e.g. rectangular), elliptical, oval-like, etc. This parameter (aspect ratio) can be optimized alongside with D (being a distance between the two successive features 14 in the same array 16, 18) to maximize the SPP energy while still maintaining the desired functionality. A practical, "safe" selection is between L=5 W and L=2.5 W.

$D=\lambda_{spp}/2$. Again this is an initial "safe" selection and the vertical density of the slits can be increased by optimization process.

The slits are slanted at $\theta_1=145°$, $\theta_2=45°$ with respect to the horizontal axis.

The geometry of the pattern (defined by the above parameters) can be optimized to obtain maximal energy in the focal spot, while maintaining the functionality of the lens. For example, at the illumination (exciting) wavelength $\lambda_{illum}=671$ [nm], on a gold-air interface with the SPP wavelength $\lambda_{spp}\approx650$ [nm], the following parameters were used: S=162.5 [nm], D=325 [nm], W=L/5=50 [nm].

The array of elements/features are placed on a spiral curve, e.g. curve defined by the Archimedes' spiral equation $$r = r_0 \pm \frac{\lambda_{spp}}{2\cdot\pi}\cdot\theta$$

where r,θ are coordinates in the polar representation, $\lambda_{spp}$ is the SPP wavelength and $r_0$ a free parameter defined by external constraints and/or by the amount of acceptable losses in the given configuration.

The basic requirement is that at least one arm (segment) of the spiral is constructed, i.e. the elements/features are placed on the curve for $\theta\in[0,2\pi]$. Constructing multiple arms (FIG. 3b) by taking $\theta\in[0,2m\cdot\pi]$, m>1 enhances the energy in the focal spot of the lens.

A polarization dichroic plasmonic lens focuses SPPs generated with a certain polarization and does not focus those of the orthogonal polarization state. As described above, the known plasmonic polarization dichroic lenses achieve high contrast dichroism in small areas, on the order of the SPP wavelength, e.g. FIGS. 2b,c. This poses severe limitation on the application of such lenses with existing detectors.

Figures 5A, 5C:
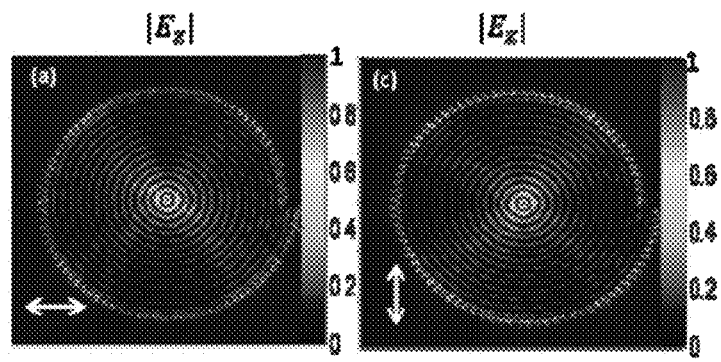
FIGS. 5a-d illustrate linear polarization direction independent focusing achieved with the plasmonic lens of the invention, where
Figures 5B, 5D:
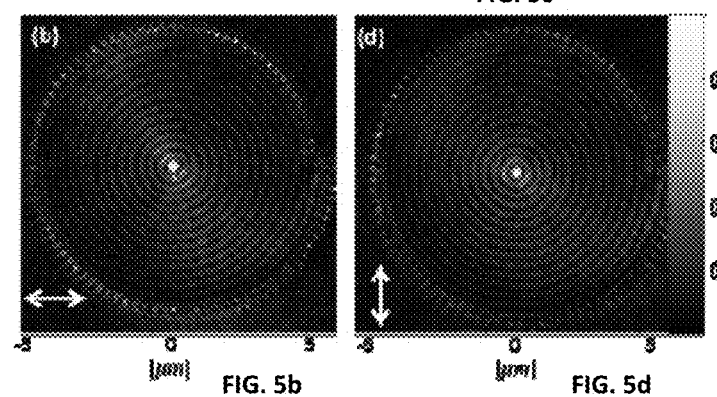

The lens of the invention provides high contrast circular dichroism inside a large area and independent of the SPP wavelength, allowing seamless integration with actual detectors (as will be described below with reference to FIG. 5). The out-of-plane field components are desirable in various devices, for example satisfying the absorption selection rules of unipolar quantum wells based detectors. Thus, the lens of the invention, in combination with these detectors may serve as circular polarization discriminating pixels.

Figures 4A, 4B:
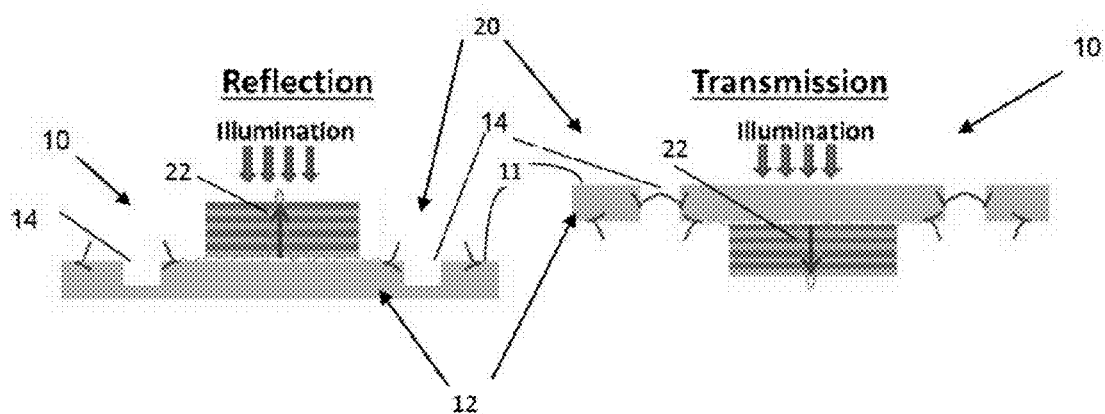
FIGS. 4a-b exemplify a detector (e.g. a quantum well based detector) utilizing the invention and configured for operation in a reflection mode (FIG. 4a) and in a transmission mode (FIG. 4b).

In this connection, reference is made to FIGS. 4a,b, showing the layered structure of a quantum well based detector 20. Arrows 22 represent the direction of the polarization of the focused field. Each of these figures shows a cross section of a metal layer/plate 12 with the lens 10 structure (patterned surface 11 comprising a pattern of features 14) engraved into it. The illumination is coming from above and is turned into SPPs that are being focused in a reflection mode (FIG. 4a) or in a transmission mode (FIG. 4b) into the respective light sensitive surface/pixel (not shown here) of the detector with which the lens 10 is aligned.

Thus, the invention provides a novel configuration of the optical detector including an array of pixels, where each pixel includes a light sensitive surface and a respective plasmonic lens configured according to the invention. The lens is located upstream of the light sensitive surface (with respect to the light propagation through the detector structure) and includes a patterned surface formed by spaced apart elongated features arranged along a segment of a spiral curve, each feature defining an elongated metallic-dielectric interface.

As indicated above, the plasmonic lens of the invention achieves efficient linear-polarization-independent plasmonic focusing while using all the perimeter of the lens to couple light into SPPs. In this connection, reference is made to FIGS. 5a,b,c,d showing linear polarization direction independent focusing. Here, FIGS. 5a,c show simulation results, and FIGS. 5b,d show experimental results, for first (FIGS. 5a,b) and second (FIGS. 5c,d) linear polarizations. As shown, focus is obtained for both polarizations. It is also clear that SPPs are produced from all the perimeter of the lens as opposed to that of FIGS. 2a,b corresponding to the conventional spiral-shaped lens).

Figures 6A, 6C:
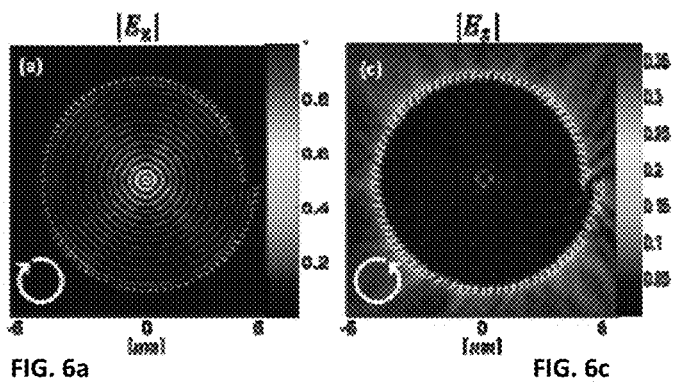
FIGS. 6a-d illustrate circular dichroism achieved by the plasmonic lens of the invention, where
Figures 6B, 6D:
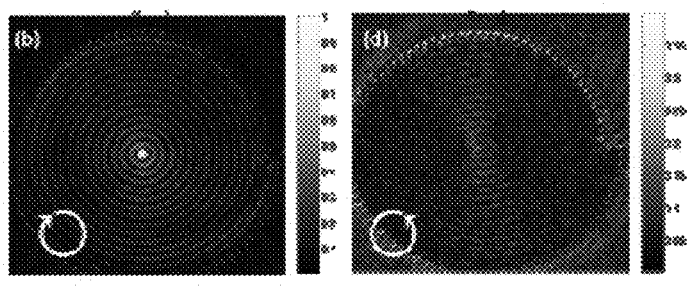

As also indicated above, the plasmonic lens of the invention, contrary to the known polarization dichroic lenses, achieves high contrast circular dichroism inside a large area independent of the SPP wavelength allowing seamless integration with actual detectors. In this connection, reference is made to FIGS. 6a,b,c,d illustrating circular dichroism achieved by the plasmonic lens of the invention. Here, FIGS. 6a,c show simulation result of left (FIG. 6a) and right (FIG. 6c) circularly polarized illumination indicated by arrows, and FIGS. 6b,d show the experimental results.

It is evident that practically no field enters the inside of the lens. The illustrations of simulation and experimental results share the same scale. When illuminated with circularly polarized light, the lens focuses one polarization and does not focus the orthogonal state. For the focused state, the SPPs propagate only inward and no energy goes outward resulting in an additional gain of a factor of 2 over the existing methods.

Reference is now made to FIGS. 7a-7f, 8a-8f and 9a-9d presenting comparative analysis of the experimental results obtained by the inventors for a plasmonic lens with a patterned surface in which the pattern features are arranged along a circle and for the plasmonic lens of the invention configured as described above having the pattern along a spiral curve. FIG. 7a is a SEM image of the fabricated circular configuration; FIGS. 7c,e show NSOM measurements of the structure under linearly polarized illumination (shown by white arrows), and FIGS. 7d,f show FDTD simulation of the structure corresponding to the experimental conditions. FIG. 7b illustrates comparison of Bessel function intensities describing the Spiral focal field ($J^2_0$) and the circle focal field ($J^2_1$). The peak intensity value of $J^2_1$ is about 3 times smaller then that of $J^2_0$.

Focusing by a plasmonic structure is defined as the constructive interference of the out-of-plane field in the focal spot. It should be noted that the above figures show that the circular structure does not result in focusing of the out-of-plane component. The necessary focusing condition is not met by the structure and the out-of-plane field component destructively interferes in the center of the lens resulting in a dark spot.

The inventors also performed a high resolution scan of a 1×1 µm area around the focal region of the two structures. The results are illustrated in FIGS. 8a-8f showing NSOM measurements of the meta spiral lens (FIGS. 8a,b,c) vs. that of the circular configuration (FIGS. 8d,e,f) under linear polarization illumination (shown by white arrows). Here, FIGS. 8a,d show the overview of the corresponding structures and FIGS. 8b,c,e,f present high resolution scans of the amplitude (FIGS. 8b,e) and phase (FIGS. 8c,f) respectively.

The focusing by the spiral structure (FIG. 8b) is clearly shown versus the dark spot generated by the circular structure (FIG. 8e). Moreover, the experimental phase data of the focal field shows how the circular—constant curvature—configuration does not provide geometrical phase to compensate for the linear, polarization-dependent, phase of the slanted slit structure (as described above). This is evident from the azymuthal phase gradient around the center of FIG. 8f. It is shown that encircling the central spot one accumulates $2\pi$ phase, which is characteristic of an electromagnetic vortex of order 1. Conversely, the MASPL exhibits "perfect" concentric phase fronts FIG. 8c demonstrating the compensation of the polarization dependent phase by the geometric phase of the superimposed spiral curvature.

Figure 9A:
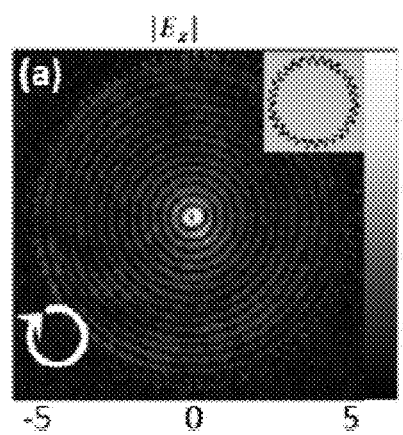
FIGS. 9a-9d present experimental (FIGS. 9c-d) and simulated results (FIGS. 9a-b) for a plasmonic lens with a circular patterned surface.
Figure 9B:
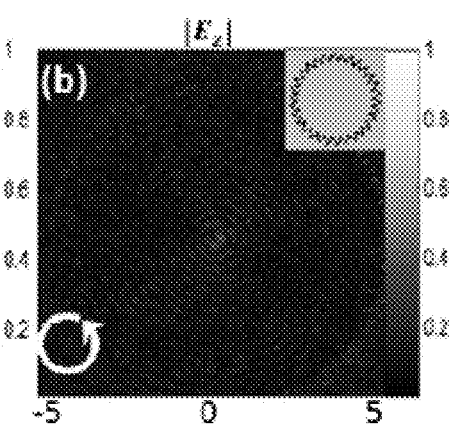
Figure 9C:
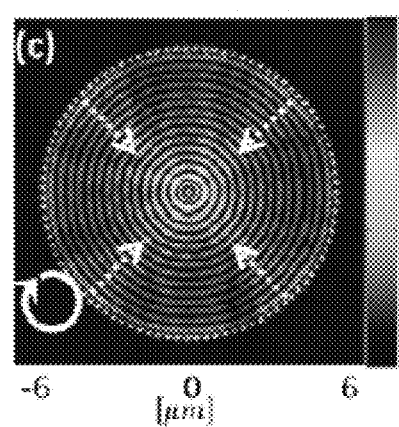
Figure 9D:
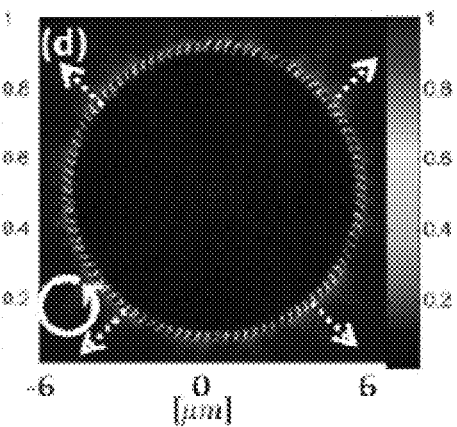

The inventors further compared between the circular and spiral structures by performing measurement of the circular structure under circularly polarized illumination. This is illustrated in FIGS. 9a-d showing the experimental NSOM results (FIGS. 9a,b) and corresponding FDTD simulations (FIGS. 9c,d) of the circular structure under circularly polarized illumination (solid white arrows). The dotted arrows represent the SPP propagation direction inward mainly (FIG. 9c) and outward mainly (FIG. 9d).

Thus, the functionality of the slanted slit configuration is maintained. The structure sends the SPPs coupled by the matched circularly polarized illumination inward, towards the center of the structure and the orthogonal polarization practically does not penetrate the interior of the lens. However, the contrast between the polarizations is much lower than for the MASPL. This is mainly because of the following: As shown in FIG. 8b, the theoretical peak intensity of the MASPL focal field is 3 times larger than the peak intensity of the field inside the circular structure. Also, due to the chiral symmetry of the spiral, the residual field penetrating the interior of the MASPL is spatially different from the focused field. In the vicinity of the center, the contrast is theoretically infinite. For the circular structure, the residual field has the form of the focused field, due to the symmetry of the circle. This can be seen in the simulation and experimental data. This fact drastically limits the contrast of this structure. The experimentally obtained intensity contrast of the circular structure is about 8 compared to the 2 orders of magnitude in intensity for the MASPL.

Thus, the present invention provides a novel plasmonic lens which is configured as a patterned surface (metasurface) spiral plasmonic lens enabling to solve multiple efficiency and functionality issues of conventional plasmonic lenses. The metasurface lens of the invention achieves efficient high contrast linear-polarization-independent plasmonic focusing and efficient high contrast circular dichroism. These properties of the lens are suitable for use in optical detectors.

The invention claimed is:

1. A plasmonic lens comprising a surface for interaction with an input electromagnetic field, wherein said surface has a pattern comprising an arrangement of a plurality of elongated spaced-apart features of a predetermined geometry arranged in a spaced-apart relationship along at least one segment of a spiral curve, each of said features defining an elongated interface for creation of surface waves in response to the interaction with the incident electromagnetic field, such that said pattern provides linear-polarization-independent plasmonic focusing and circular polarization dependent plasmonic focusing of the electromagnetic field incident on said pattern.

2. The plasmonic lens of claim 1, wherein said surface is a metallic surface, and said pattern is formed by the plurality of spaced apart elongated slits, said interface being a metallic-dielectric interface.

3. The plasmonic lens of claim 1, wherein the spiral curve is an Archimedes spiral curve.

4. The plasmonic lens of claim 1, wherein said pattern is configured with a selected distance S between the features such that $S=\lambda_{spp}/4$, where $\lambda_{spp}$ is the created surface wavelength for a given operational frequency of the electromagnetic field.

5. The plasmonic lens of claim 1, wherein said pattern is configured with a selected high aspect ratio of the elongated feature such that $W \ll L$, where W and L are respectively a width and a length of the elongated feature.

6. The plasmonic lens of claim 5, wherein the elongated features comprise one or more features having one or more of the following geometries: polygonal, elliptical, oval-like.

7. The plasmonic lens of claim 4, wherein said pattern is configured with a distance D between the adjacent features in the same array maximize satisfying a condition that $D=\lambda_{spp}/2$, where $\lambda_{spp}$ is the created surface wavelength for a given operational frequency of the electromagnetic field.

8. The plasmonic lens of claim 1, wherein said features are inclined with respect to a spiral path defined by said at least one segment of the spiral curve.

9. The plasmonic lens of claim 8, wherein said plurality of features are arranged in two arrays extending along and at both sides of the spiral path, being oppositely inclined with respect to said spiral path.

10. The plasmonic lens of claim 9, wherein said elongated features are slanted at $\theta_1=145°$, $\theta_2=45°$ with respect to a horizontal axis.

11. The plasmonic lens of claim 3, wherein the spiral curve is defined by the Archimedes' spiral equation $$r = r_0 \pm \frac{\lambda_{spp}}{2 \cdot \pi} \cdot \theta$$

where r,θ are coordinates in the polar representation, $\lambda_{spp}$ is the created surface wavelength for a given operational frequency of the electromagnetic field, and $r_0$ a free parameter defined by external constraints and/or by amount of acceptable losses.

12. The plasmonic lens of claim 11, wherein said features are arranged along the single segment of the spiral curve for $\theta \in [0, 2\pi]$.

13. The plasmonic lens of claim 11, wherein said features are arranged along multiple segment of the spiral curve $\theta \in [0, 2m \cdot \pi]$, m>1.

14. An optical detector comprising an array of pixel units, wherein each pixel unit comprises a light sensitive surface and a plasmonic lens located upstream of said light sensitive surface with respect to direction of propagation of input electromagnetic signal, the plasmonic lens comprising a surface for interaction with the input electromagnetic signal, wherein said surface has a pattern comprising an arrangement of a plurality of elongated spaced-apart features of a predetermined geometry arranged in a spaced-apart relationship along at least one segment of a spiral curve, each of said features defining an elongated interface for creation of surface waves in response to the interaction with the incident electromagnetic signal, such that said pattern provides linear-polarization-independent plasmonic focusing and circular polarization dependent plasmonic focusing of the electromagnetic signal incident on said pattern.

* * * * *